US008578346B2

(12) United States Patent
Chao et al.

(10) Patent No.: US 8,578,346 B2
(45) Date of Patent: Nov. 5, 2013

(54) SYSTEM AND METHOD TO VALIDATE AND REPAIR PROCESS FLOW DRAWINGS

(75) Inventors: Tian-Jy Chao, Bedford, NY (US); Pankaj Dhoolia, Uttar Pradesh (IN); David Marston, Manchester, NH (US); Debdoot Mukherjee, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/879,396

(22) Filed: Sep. 10, 2010

(65) Prior Publication Data
US 2012/0066662 A1    Mar. 15, 2012

(51) Int. Cl.
*G06F 9/44* (2006.01)

(52) U.S. Cl.
USPC .......................................... 717/132; 717/144

(58) Field of Classification Search
USPC .......... 717/101–178; 714/1–728; 705/50–912
See application file for complete search history.

(56) References Cited

U.S. PATENT DOCUMENTS

| | | | |
|---|---|---|---|
| 6,243,092 B1* | 6/2001 | Okita et al. | 715/866 |
| 7,099,809 B2* | 8/2006 | Dori | 703/6 |
| 7,657,411 B2* | 2/2010 | Poetsch et al. | 703/6 |
| 7,680,632 B1* | 3/2010 | Aldrich | 703/1 |
| 7,913,225 B2* | 3/2011 | Seemann et al. | 717/117 |
| 7,941,299 B1* | 5/2011 | Aldrich et al. | 703/1 |
| 8,079,000 B2* | 12/2011 | Koelbl et al. | 716/104 |
| 8,209,672 B2* | 6/2012 | Ivanov | 717/136 |
| 2004/0090439 A1* | 5/2004 | Dillner | 345/440 |
| 2004/0249645 A1* | 12/2004 | Hauser et al. | 705/1 |
| 2007/0088598 A1* | 4/2007 | Challapalli et al. | 705/10 |
| 2007/0112718 A1* | 5/2007 | Liu et al. | 706/47 |
| 2007/0118551 A1* | 5/2007 | Akkiraju et al. | 707/102 |
| 2007/0179821 A1* | 8/2007 | Poetsch et al. | 705/7 |
| 2007/0214173 A1* | 9/2007 | Ohashi et al. | 707/102 |
| 2007/0266377 A1* | 11/2007 | Ivanov | 717/136 |
| 2008/0263503 A1* | 10/2008 | Polly et al. | 717/100 |
| 2009/0064111 A1* | 3/2009 | Kornerup et al. | 717/126 |

(Continued)

OTHER PUBLICATIONS

Qualitative and Quantitative Analysis of Workflows Based on the UML Activity Diagram and Petri Net-Kwan Hee Han*, Seock Kyu Yoo, Bohyun Kim*-Department of Industrial & Systems Engineering, Engineering Research Institute, Gyeongsang National University, Korea*, VMS Soutions Co., Ltd—2009.*

(Continued)

*Primary Examiner* — Lewis A Bullock, Jr.
*Assistant Examiner* — Francisco Aponte
(74) *Attorney, Agent, or Firm* — Louis J. Percello; Otterstedt, Ellenbogen & Kammer, LLP

(57) ABSTRACT

Disclosed is a system and method for validating and repairing flow diagrams using a process modeling validation method in conjunction with a process modeling repair method. The process modeling validation method points out structural ambiguities in a flow diagram that can make its automatic interpretation difficult. It also proposes fix to resolve such ambiguities. The method discloses a process semantic annotation scheme that can interpret process semantics in a flow graph implicit in a flow diagram. Further, the validation process compares one or more components of one or more drawings to a set of rules determined by a business process modeling standards and provides a set of semantic errors describing faulty parts of the drawing that do not comply with the business process modeling standards. The process modeling repair method corrects the drawing to ease and enable its automatic interpretation of the flow diagram and make the faulty parts of the drawing comply with the business process modeling standards.

19 Claims, 12 Drawing Sheets

(56) References Cited

U.S. PATENT DOCUMENTS

| | | | |
|---|---|---|---|
| 2009/0265684 A1* | 10/2009 | Fuchs et al. | 717/105 |
| 2009/0327942 A1* | 12/2009 | Eldridge et al. | 715/771 |
| 2010/0005454 A1* | 1/2010 | Sankaranarayanan et al. | 717/127 |
| 2010/0114619 A1* | 5/2010 | Birsan et al. | 705/7 |

OTHER PUBLICATIONS

The Use of Semantic Constraints on Diagram Editors—J. Artur Serrano Computing Science Department, University of Glasgow, Scotland, UK—1995.*

Checking Properties of Business Process Models with Logic Programming—Volker Gruhn and Ralf Laue—Chair of Applied Telematics / e-Business Computer Science Faculty, University of Leipzig, Germany—2007.*

A family of experiments to validate metrics for software process models—G. Canfora a, F. García b,*, M. Piattini b, F. Ruiz b, C.A. Visaggio—Research Centre on Software Technology, Dipartimento di Ingegneria, Universita del Sannio—The Journal of Systems and Software 77 (2005).*

Transformation of SBVR Business Design to UML Models—Amit Raj, T. V. Prabhakar, Stan Hendryx—Unisys Global Services India, Deptt. of Computer Science IIT—Kanpur, Hendryx & Associates Sunnyvale, California-2008.*

BPM-Xchange® | Universal model, meta and masterdata exchange and transformation, downloaded from http://www.bpm-x.com/, Jun. 11, 2013 pp. 1-2.

* cited by examiner

```
algorithm InferEdges
input    W_n, W_e  nodes and candidate edges
output   edgeList  inferred flow edges
begin
    // create CP for line-node junctions
 1. foreach l ∈ W_e and endpoint ep do
 2.     foreach node n ∈ W_n do
 3.         if n is nearby ep then
 4.             create connection point C:
                    C_ep = ep, C_line = l, C_conn = n
                    C_isEnd = true, C_dir = SRC | TGT
 5.             add C to CP sets for l and n
    // create CP for intersection of lines
 6. foreach l ∈ W_e and endpoint ep do
 7.     foreach l_x ∈ W_e do
 8.         if l is nearby ep then
 9.             create connection point C_x:
                    C_x,ep = ep, C_x,line = l_x, C_x,conn = C
                    C_x,isEnd = false, C_x,dir = NEU
10.             add C_x to CP set for l_x
11.             create connection point C:
                    C_ep = ep, C_line = l, C_conn = C_x
                    C_isEnd = true, C_dir = TGT | UNK
12.             add C to CP set for l
    // connect nodes
13. foreach node n ∈ W_n do
14.     foreach conn. point C of n do
15.         nodeSet = ∅; visit(C) = false
16.         propagateDirection(C_dir, C_line, nodeSet)
17.         foreach n' ∈ nodeSet do
18.             if C_dir = SRC then
19.                 add (n, n') to edgeList
20.             else add (n', n) to edgeList
end procedure propagateDirection(dir, l, ns)
begin
21. foreach conn. point C of l do
22.     if visit(C) then continue
23.     visit(C) = true
24.     if C_isEnd ∧ match(C_dir, dir) then
25.         continue
26.     if ¬C_isEnd ∧ ¬match(C_dir, dir) then
27.         continue
28.     if C_conn instanceof Node then
29.         add C_conn to ns
30.     else if C_conn instanceof ConnPt then
31.         C_x = C_conn; l_x = C_x,line
32.         if ¬match(C_x,dir, dir) then continue
33.         propagateDirection(dir, l_x, ns)
end function match(interDir, destDir)
begin
34. if interDir = destDir then
35.     return true
36. else if interDir = NEU ∨ UNK then
37.     return true
38. return false
end
```

Figure 11

SYSTEM AND METHOD TO VALIDATE AND REPAIR PROCESS FLOW DRAWINGS

FIELD OF THE INVENTION

This invention relates to the field of drawing (including flow diagram) generation, checking, modification, and correction. More specifically, the invention relates to validation and repair of process flow drawings that are used as inputs in formal process modeling tools.

BACKGROUND OF THE INVENTION

Brief Description of the Prior Art

Flow diagrams are drawings or a set of drawings that are generally created by drawing tools like Microsoft Visio and Power Point. These tools produce formats that widely vary. Also, there is no uniform format for these drawing tools.

As a result, the look-and-feel of process flows created by different process modeling tools is quite different. Differences in the process flows include differences in: graphical representations of flow elements, connection points on each shape, connector routing, connector appearance, lanes and grouping boxes, indicators of repetition or subroutine processes, data interchange among tasks. The internal representations of these features are different, even when some of the tools employ the same Extensible Markup Language (XML) format.

In some tools a full text search of the drawing is difficult because formatting instructions (e.g. bold, underline, center, color change, etc.) can be intermixed with content data, e.g. text label of a shape.

In some tools, additional information about a part of the process may be conveyed graphically, using informal pictograms or color coding known only to one site on the drawing. This also makes text searching difficult.

A drawing tool is intended to produce a work product that looks good to the unaided human eye which will tolerate wrong types of lines and polygons, or lines that only appear to touch. While many tools can correct these errors to make the work product appealing to an unaided human eye, these corrections are difficult when reusing the process flows created by one tool in another tool.

Stencils are templates, usually in a pallet, that drawing tools use to create process flow diagrams. Stencils have elements. For example, Visio has stencils that represent a process (a rectangle), decision points (a diamond), connectors (lines or arrows), etc.

Formal business process models have been used increasingly not only to describe the steps and procedures of how business operations work but also to produce downstream deployable code to targeted systems. As a result, many proprietary business process modeling tools have been offered by vendors to create business process flows. For example, some business process modeling tools that have been in the marketplace are Architecture of Integrated Information Systems (ARIS), IBM WebSphere Business Modeler (WBM), System Architect, iLOG, as well as Microsoft Visio, which does not produce any downstream deployable code.

Stencils are also used in formal business process modeling tools, which typically enforce business process modeling standards. The Business Process Modeling Notation (BPMN), a well known modeling standard, has elements that tool vendors use to implement stencils in the vendor modeling tools. For example, in BPMN stencil elements include Activities, Events, Gateways, Connections, Artifacts, and Swim-lanes. BPMN has standards that enforce semantics that define the use of stencils in the creating of formal business process models. This allows subsequent code generation using the formal business process model. The code generated produces a runtime system defined by the business process model.

FIG. 1 is a block diagram showing a prior art process 100 of transforming a drawing, e.g. a flow diagram 105 with one or more drawings into code for a runtime system 125.

The process 100 begins when flow diagrams or general drawings 105 having one or more drawings are created by the drawing tools. As stated above, drawing tools are well known and include Visio, Power Point, etc.

At this point a drawing conversion process or tool 110 is needed to convert the drawing into a formal business process model 115 that can eventually generate code 120 and then result in a runtime system 125.

Much of the prior art manually converts 110 the general drawing 105 into a formal business process model 115.

There are some prior art systems, like WB Modeler that can perform the conversion 110 from a flow diagram/general drawing 105 into a formal business process model automatically. However, these modeling tools 115 require that the stencil in the drawing 105 and the stencils in the formal business process model 115 be perfectly mapped in order to accurately perform the conversion 110. In addition, to convert 110 correctly, there can be no errors or ambiguities in the flow diagram/drawing 105. For example, many problems occur in the prior art when importing into a business process modeling tool 115 if there is an invalid construction of the flow diagram 105, i.e. connectors are not properly connected to shapes.

USPTO filing 20070214173 to Ohashi, et al. describes a "Program, method, and apparatus for supporting creation of business process model diagram." Fujitsu discloses a case where the verification rule includes a changed pattern for modifying the verification target element that does not satisfy the verification rule, to satisfy the verification rule, and a verification means obtains the dissatisfaction result. The verification result display means displays the business process model diagram with the verification target element changed according to the changed pattern.

Problems with the Prior Art

While some prior art drawing tools do basic diagram syntax validation, e.g., snap connectors to shapes and rudimentary proximity detection, the prior art does not validate a flow diagram 105, i.e., the prior art does not identify errors or ambiguities in the flow diagram 105. Further, the prior art does not automatically perform repair of these error or ambiguities so the flow diagram 105 with these errors and ambiguities cannot be automatically converted to a formal business process models 115. Some prior art can detect some errors but can only indicate that there is an error to a user, the prior art does not provide the corrections.

Furthermore, if a flow diagram 105 is not repaired or cannot be automatically converted 110 into a formal business process model 115, the user has to manually recreate the formal business process model in a business process modeling tool in order for the downstream code generation 120 and runtime system 125 to be produced.

In addition, since the prior art cannot validate and repair the flow diagram 105, the model conversion tools 110 could erroneously convert 110 the flow diagram 105 into an erroneous formal process model 115 which could in turn fail to generate any code or generate erroneous code 120. The erroneous conversion 110 from flow diagram 105 to formal business process model 115 by the prior art may or may not be apparent to the user.

Therefore, there is a significant need to validate flow diagrams and correct and repair any invalid portion of the flow diagram 105 so that the flow diagrams 105 can be correctly converted 110 into valid formal business process models 115 and reused by various modeling tools to correctly generate code 120 for the runtime system 125.

The prior art does not employ strategies to fix the errors which are not immediate from a single rule that is violated. For example, the prior art does not fix error types that cause a set of violations of rules imposed by standards or a causal chain of these violations. If the prior art detects an error, it does not detect or fix "downstream errors" that are created or could be created from correcting the first error detected.

It is possible for process flows 105 to contain wide variations in styles, e.g. those process flows 105 created by drawing tools like Visio. However, drawing tools like Visio provide no enforcement/validation of usage and assign no intrinsic meaning to shapes. The prior art does not: i. validate process flows of local styles, especially for those created via drawing tools like Visio by detecting common drawing errors of process flows, ii. convert semantically significant graphical decorations to data values or text, iii. provide error detection and validation rules to detect abnormality of parts of the process flow that are invalid or not conforming to the modeling rules or conventions 115.

For example, in the prior art there is no enforcement of standards like intrinsic meanings for shapes. A standard might require a decision point in the model to be represented by a diamond shape but if the decision point is represented by a rectangle no error is detected. Also, the prior art doesn't enforce any standard for decorations like labels or other annotations. A label, e.g., "create order," in a shape, might require a specific graphic shape or specific inputs or outputs. The prior art won't detect errors of this kind. The prior art doesn't recognize errors in business modeling standards like a decision point has to connect to at least two alternative outputs, etc.

The prior art does not provide rules for fixing and repairing of parts of the flow diagrams that are invalid.

The prior art does not create a valid process flow by applying recommended corrections to detected drawing errors according to certain standard format. The prior art does not repair those drawing errors automatically, for example, enforcing BPMN requirements, thus enabling downstream successful transformation into code by modeling tools.

The prior art does not enable bulk, batch-oriented, automated fixing of many invalid flow diagrams obtained over time from various projects. The prior art can not significantly improve (validate and repair) flow diagrams so they can be re-used for conversion 115 and code generation 120.

Aspects of the Invention

An aspect of this invention is a process flow diagram validation and repair system and method.

An aspect of this invention is a system and method for validating and repairing flow diagrams according to rules determined by process modeling standards.

An aspect of this invention is a system and method for validating and repairing flow diagram according to rules determined by process standards, including process flow standards.

An aspect of this invention is a system and method for validating and repairing flow diagrams according to rules determined by process standards including process flow standards and process flow syntax error.

An aspect of this invention is a system and method for validating and repairing flow diagrams according to rules determined by process modeling standards.

An aspect of this invention is a system and method for validating and repairing flow diagrams with ambiguities and/or "downstream errors."

An aspect of this invention is a system and method for validating and repair process flow diagrams by adding process flow semantic annotations which describe the semantics of flow elements.

An aspect of this invention is a system and method for validating and repairing flow diagrams that could result in business process models with standard errors.

SUMMARY OF THE INVENTION

The present invention a system and method for validating and repairing flow diagrams using a process modeling standards validation method in conjunction with a process modeling repair method.

The process modeling standard validation method compares one or more components of one or more drawings to a set of rules determined by a business process modeling standard(s) and provides a set of errors describing faulty parts of the drawing that do not comply with the business process modeling standard. The process modeling repair method modifies the drawing to make the faulty parts of the drawing comply with the business process modeling standards.

BRIEF DESCRIPTION OF THE FIGURES

FIG. 9(a) shows a diagram with structural ambiguities such as dangling connectors. FIG. 9(b) shows the same flow diagram resolved of such ambiguities.

FIG. 11 shows an example edge-inference algorithm used in one preferred embodiment of the present invention.

DETAILED DESCRIPTION OF THE FIGURES

Figure 1:
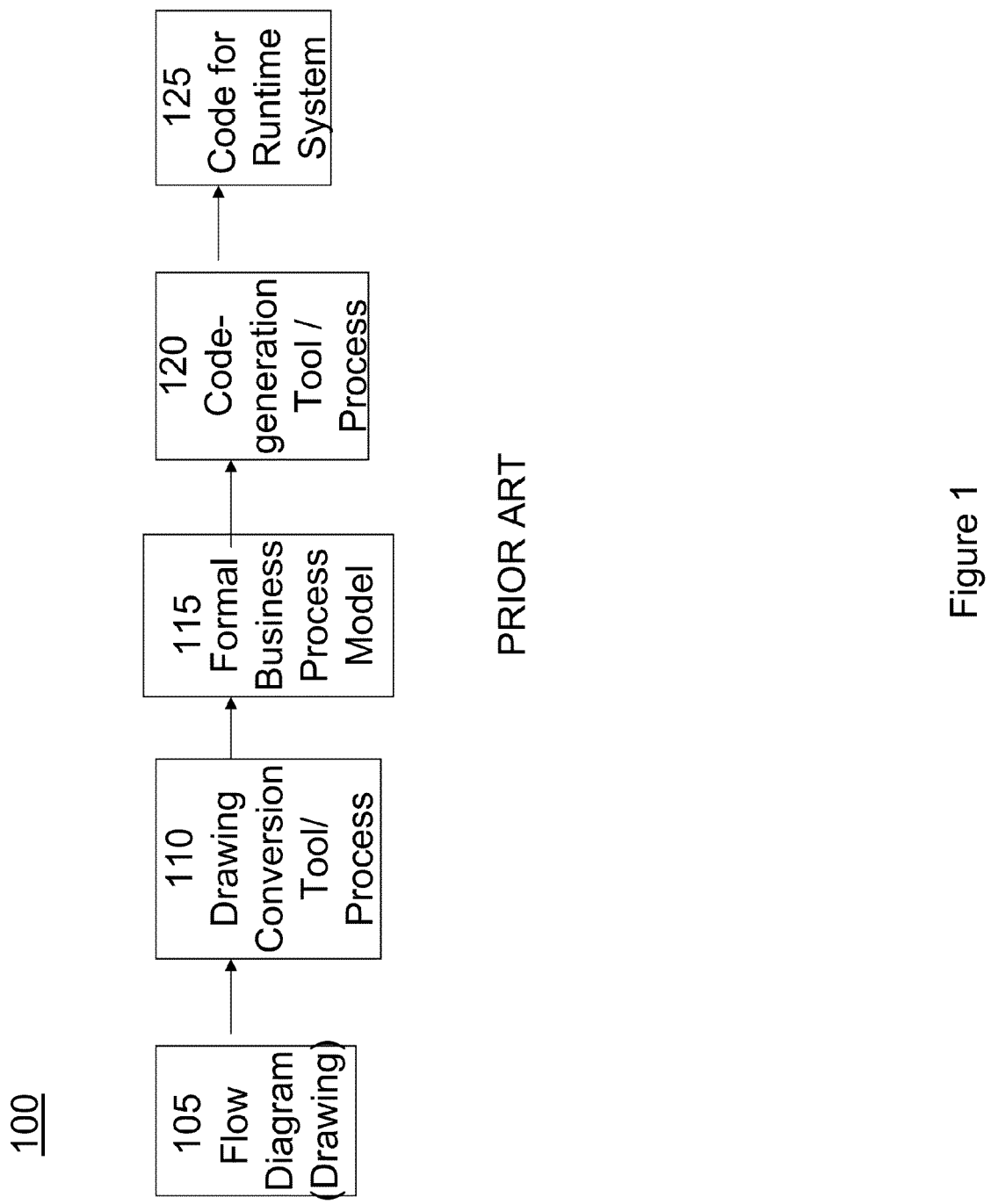
FIG. 1 is a flow diagram showing a prior art process of generating business flow process code from a flow diagram.
Figure 2:
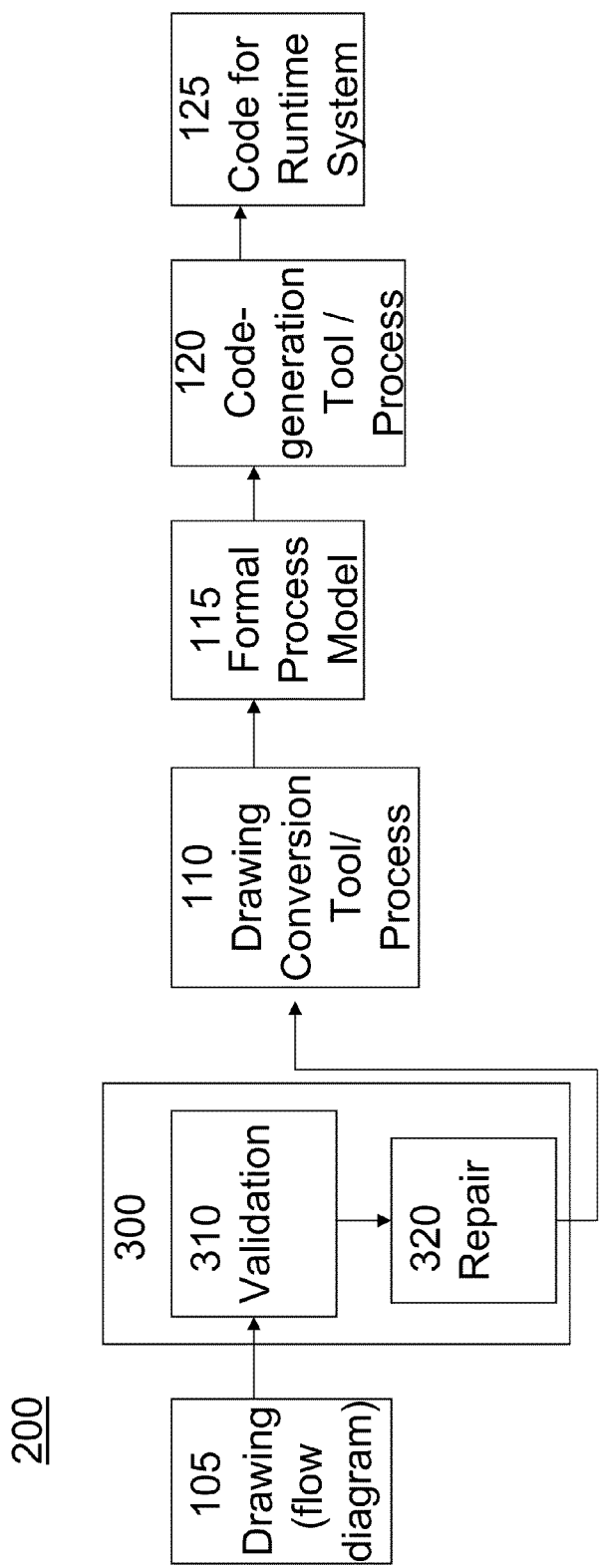
FIG. 2 is a flow diagram showing the present invention in process of generating business flow process code from a drawing, including various novel validation and repair processes.

FIG. 2 is a flow chart 200 showing the prior art processes in FIG. 1 with the novel validation function 310 and novel repairing function 320 shown together in block 300.

Figure 3:
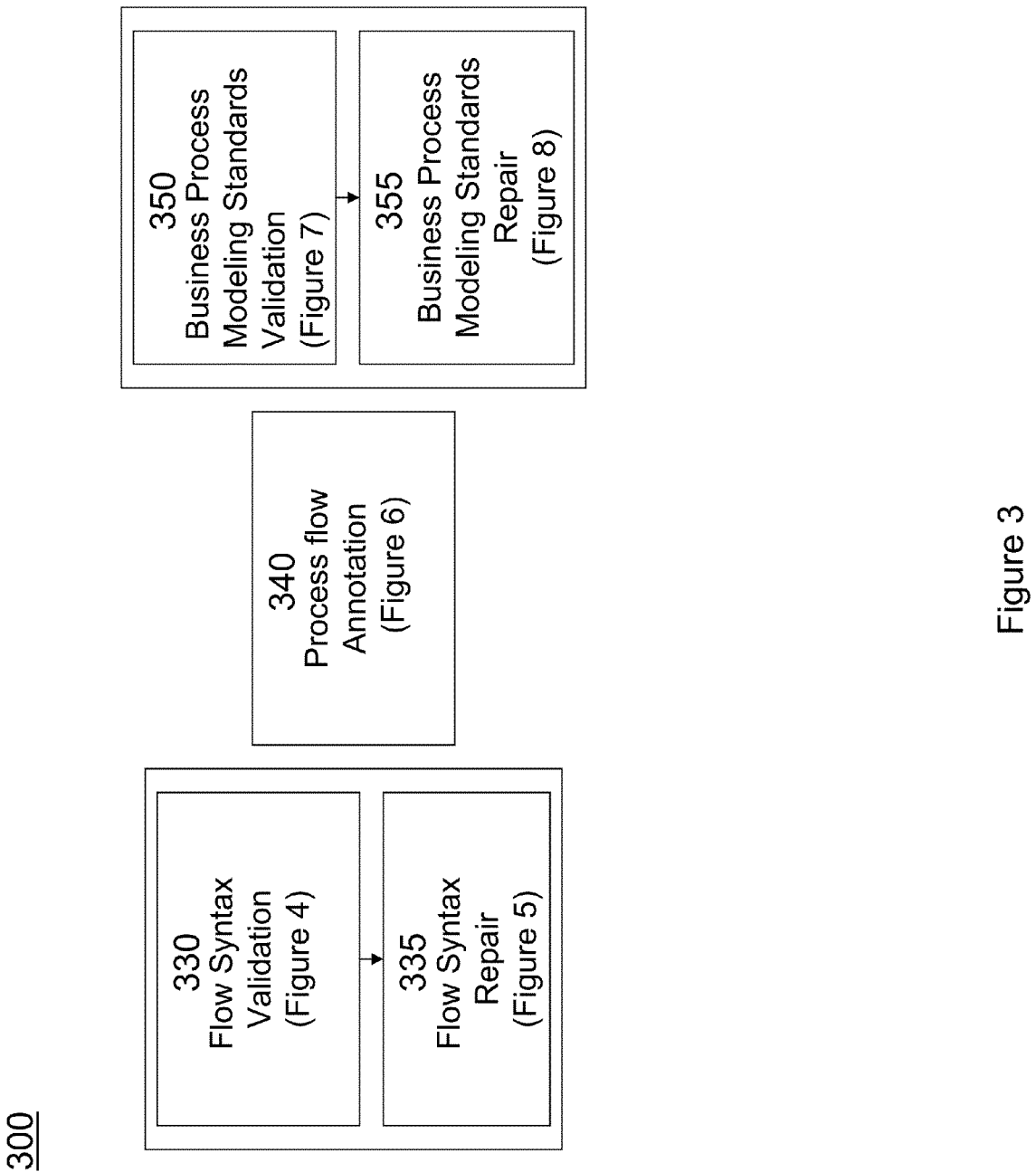
FIG. 3 is a block diagram of a preferred architecture of the present invention.

FIG. 3 is a block diagram 300 of one preferred architecture of the invention comprising a process modeling validation process 330 (see FIG. 4) which is part of the validation function 310 and process modeling repair process 335 (see FIG. 5) which is part of the repair function 320. The diagram 300 also shows optional processes process flow annotation 340 (see FIG. 6), business process modeling validation 350 (see FIG. 7), and business process modeling repair 355 (see FIG. 8) which together validate and repair the flow diagram 105 to conform to one or more given process modeling standards, e.g., BPNM.

The process flow annotation 340 provides additional metadata to support the business process modeling validation 350 and the business process modeling repair 355 processes. The business process modeling validation 350, part of the validation function 310, validates the flow diagram repaired in step 335 against the respective modeling standard. The business process modeling repair 355 processes, part of the repair function 320, repairs the flow diagram 105 validated by process 350 to create a flow process that conforms with the respective modeling standard.

The following terms as used in the description of the figures that follow in this disclosure.

Terms related to 'Flow diagram', the informal drawing 105, are defined in a non limiting way as follows:

Flow diagram: A flow diagram (or a drawing) 105, is an informal diagram created in informal drawing tools (such as Microsoft Visio, Microsoft PowerPoint, Lotus Symphony, OpenOffice, etc.) that do not enforce any formal drawing constraints on the users. Examples of formal drawing constraints are, "not allowing a user to leave a connector edge between two diagram nodes unconnected", "not allowing a user to specify a piece of text that is not connected to any diagram node or connector edge.

Shape: A diagramming unit for a flow diagram. Shapes may have several properties such as, geometry (square, triangle, diamond, etc.), color, dimensions (one dimension, two dimensions, or three dimensions, i.e., 1-D, 2-D, 3-D, respectively), text-annotations, etc.

Connector: A special shape (most likely 1-D) that represents a connection between two shapes.

Label: A piece of text on a diagram.

Unlinked Label: A piece of text, which is not explicitly linked to a connector or a shape.

Terms related to 'Flow Graph', a formal representation of a flow diagram are as follow:

Flow Graph 550: This is the formal equivalence of a Flow diagram 105. A flow graph is a graph-based formal notation used to describe a flow.

Node: A node represents a fundamental unit in the graph based formal representation of a flow. It generally represents a task, decision, or event in the context of a flow. This is a formal equivalence of a 'Shape' in a flow diagram.

Edge: A one dimensional line segment joining two nodes. In the context of flow diagrams the edge may further carry the information about directionality which makes the precedence order of the connected nodes explicit. This is a formal equivalent of a Connector element in a flow diagram.

Dangling Connector/Edge: A connector or an edge that is missing the information about, any one, or both, the nodes, that, it is supposed to connect.

Diagram Ambiguities: Diagram ambiguities in the context of informal diagrams are those situations where a human looking at the diagram knows, with reasonable confidence, what certain constructs in the diagram represent. However from the perspective of an automated agent non-trivial logic may need to be applied to reach the same interpretation. See discussion of FIG. 9 below.

Nearness: Thresholds are defined on distance between two points in a drawing or between a line and a point to gauge whether they are sufficiently close to each other to suggest that they are connected. These thresholds are set relative to the width and height over which diagram elements (e.g., shape, connector, text) span in a drawing page and are thus scale invariant.

Figure 4:
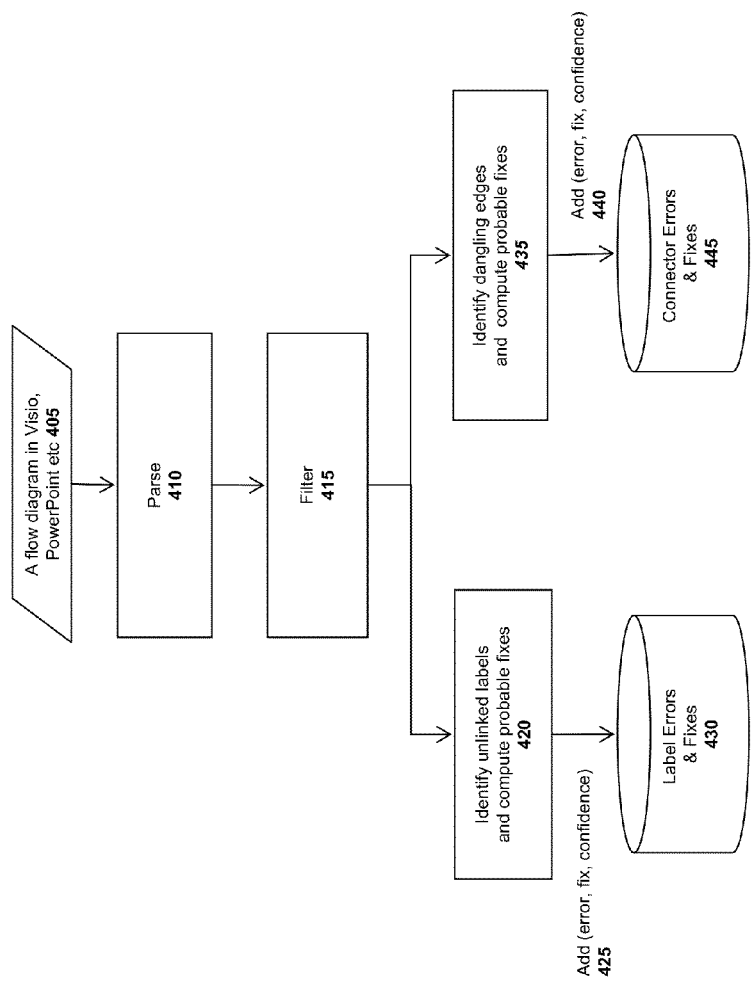
FIG. 4 is flow chart of a process for flow syntax validation.

FIG. 4 is a flow chart showing the steps of a flow syntax validation process 330.

The Flow Syntax Validation process 330:

takes an informal flow diagram 105 (possibly containing errors/diagram ambiguities) of an informal but known format (such as PowerPoint or Visio) as an input (405);

parses it to identify a set of diagram elements, e.g., shapes, connectors, and labels (and their properties) (410);

filters the set of diagram elements to eliminate from the set those elements that are not relevant from a flow perspective (415);

identifies unlinked labels and computes the probable flow elements, to which they are linked (420).

identifies dangling connectors and computes the probable nodes, to which these connectors are connected (435); and Identifies and fixes label errors (425, 430) and connector errors (440, 445).

Step 405 indicates an input informal flow diagram 105, which possibly contains errors or diagram ambiguities.

Step 410 parses the informal flow diagram to identify a set of diagram elements—shapes, connectors and text that can be classified into nodes, edges, and labels based on their properties. Format specific parsers are used to read informal diagrams expressed in a particular format. For instance .vdx, .pptx, and .svg may be parsed using Visio, PowerPoint, and SVG parsers respectively. The parsed flow diagram elements for various formats are reduced to a common set of flow-graph elements—nodes and edges.

Step 415 applies the following heuristics to discover a flow graph with a set of nodes and the set of candidates edges from diagram elements parsed in Step 410.

1. Ignore elements, such as bounding boxes, title bars, legends, etc., that are close to page boundaries and do not have possible connections.
2. Trace undirected connected lines that form closed paths to form new nodes.
3. Recognize arrowheads that are depicted as separate shapes and associate them with nearby lines.
4. Identify shapes that are near connectors as nodes.
5. Connectors whose endpoints lie near nodes or other lines are recursively identified to be part of candidate edges.
6. Identify as nodes, shape groups that have connectors emanating from their boundaries and those that do not have a possibility of a flow within them.

Step 420 identifies unlinked labels as errors in the filtered flow-graph. All diagramming formats (such Visio, ppt) allow embedding text against any drawing shape or connector. Thus, the user creating the process diagram has the option associating text against the shapes used to represent flow nodes or the connectors used to represent edges. However, users often use separate text (do not use text embedding feature) to annotate nodes and edges. In step 420, we associate all such unlinked text against the probable node or edge for which it was intended. For each such unlinked text label, compute its distance from all shapes for nodes (identified in Step 415) and from all lines that constitute candidate edges (identified in Step 415). Then, choose all nodes and candidate edges for which the distance calculated above is less than nearness threshold to be probable fixes. Step 420, also computes confidence to rank each of the fixes. Confidence is computed based on the containment, nearness, and geometric orientation, heuristic measures. A fix where the text label completely lies inside a node gets higher confidence than one in which the label is outside the boundaries of the shape of the node. Similarly text orientation along the direction of an edge raises the confidence.

Step 425 creates a 3-tuple (error, [probable fix, confidence] *) and adds the tuple to the repository 430 for the subsequent use in a repair pass.

Step 435 (can be parallel to Step 420), identifies dangling edges in the filtered flow-graph and computes probable fixes for the same This step, first discovers the set of edges that could have been intended in the drawing and then computes the set of fixes as the difference of the intended set of edges and the edge set that is evident from the drawing.

First we detail the edge inference algorithm to find the set of intended edges in a flow diagram. The edge-inference algorithm uses the concept of a connection point. A connection point is the notional point of connection at which the endpoint of a line connects to a node or an intermediate point on another line. The intersection of the endpoint of a line l with an intermediate point on another line lx generates a pair of connection points, one at the end of l and the other at the intersection point on lx.

Figure 9:
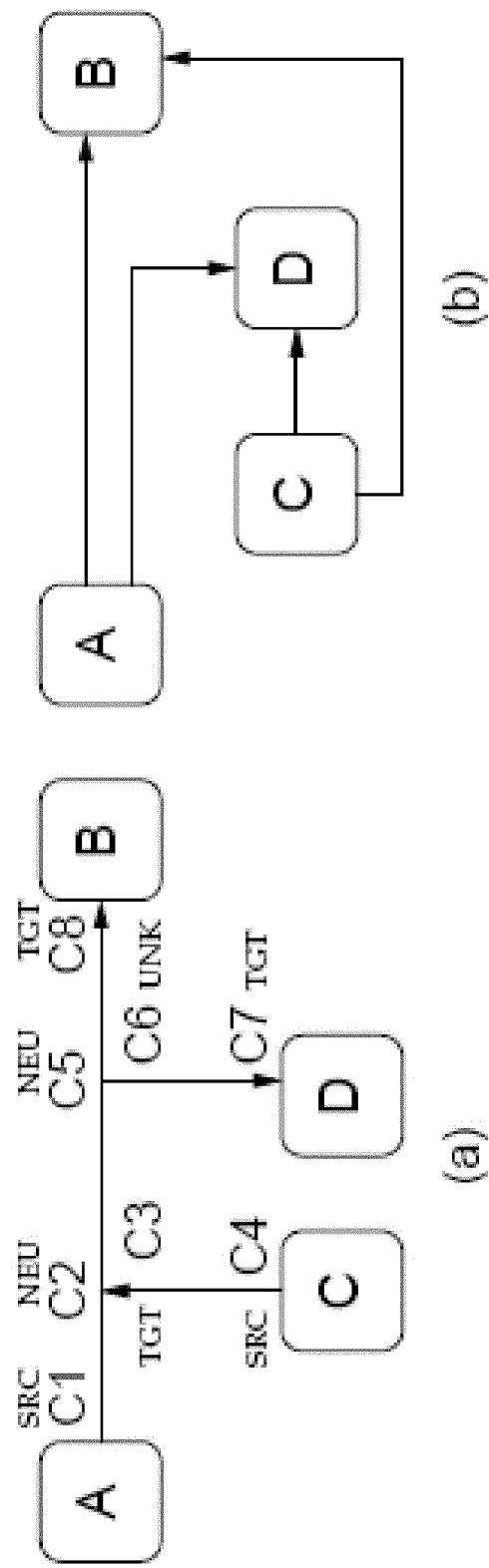
FIG. 9 is an example of illustration of how the heuristic rules in this invention can be used to resolve diagram ambiguities.

To illustrate, consider the flow graph shown in FIG. 9(*a*), which has eight connection points (labeled C1-C8). The line (A,B) has connection points C1 and C8 at its endpoints; it also has two connection points, labeled C2 and C5, at its intersections with the lines from C and D. We track the set of connection points with each line and each node.

A connection point has five attributes:
1. An end point Cep to mark the coordinates
2. An associated line Cline on which it is either an endpoint or an intermediate intersection point
3. A boolean value CisEnd indicating whether it is an endpoint or an intermediate intersection point
4. An associated node or connection point Cconn on which it is an endpoint
5. A direction Cdir, which can be src (source), tgt (target), neu (neutral), or unk (unknown)

The direction of a connection point C is found using the following rules:
1. If C lies at the junction of a node and a line:
Cdir=tgt, if there is an arrowhead at Cep
Cdir=src, otherwise
2. If C is at the junction of the endpoint of a line l and an intermediate point on line lx:
Cdir=neu, if C lies on lx (i.e., CisEnd=false)
Cdir=tgt, if C lies on l and there is an arrowhead at Cep
Cdir=unk, if C lies on l and there is no arrowhead at Cep FIG. 11 presents the edge-inference algorithm: InferEdges. The algorithm takes as inputs the set of nodes and candidate edges in the flow graph, and returns as output the inferred edges. Intuitively, the algorithm traverses the flow graph, starting at a connection point on a node, and identifies reachable nodes such that the directions encountered during the traversal are consistent.

Lines 1-5 of the algorithm create connection points for the junctions of lines and nodes. For each line l and each endpoint ep of l, the algorithm iterates over the nodes (lines 1{2). It uses thresholds for nearness to determine whether a node n could be connected to ep (line 3). It then creates a connection point C, with the appropriate attributes, and adds C to the set of connection points for l and n. The direction of C is set to src or tgt depending on whether an arrowhead occurs at ep. Similarly, lines 6-12 of InferEdges create connection points for the intersection of two lines l and lx. In this case, two connection points (Cx and C) are created. Cx is created for the intermediate intersecting point on lx, whereas C is created for the endpoint of l.

After creating the connection points, InferEdges connects the nodes by traversing the flow graph starting at each node n and following each connection point on n (lines 13-16). After the traversal for a connection point is complete, appropriate edges are created between n and the nodes reached during the traversal (lines 17-20).

Procedure propagateDirection traverses the flow graph, along paths in which the directions are consistent, and identifies the reached nodes. Given a line l and direction dir, the procedure processes each connection point C of l that has not been previously visited (lines 21-22). If C is an endpoint and Cdir and dir match, i.e., either both are src or both are tgt, the procedure abandons the traversal as the path does not represent a valid edge (lines 24-25). If C is an intermediate point, the traversal terminates if both of the following conditions hold: (1) Cdir does not match dir and (2) Cdir is neither neu nor unk (lines 26-27). If C occurs at a node, the procedure has found an edge; therefore, it adds the node to the set of nodes (lines 28-29). Alternatively, if C occurs at an intermediate intersection, the algorithm continues traversing if the directions are consistent (lines 30-33).

To illustrate the steps of the algorithm, consider the traversal performed by InferEdges, starting at connection point C1 in FIG. 9(*a*). InferEdges processes each connection point on line (A,B) (line 21 of propagateDirection). We illustrate the processing of C2 and C5. In both cases, the condition at line 24 evaluates false because C2 and C5 do not occur at endpoints: the condition at line 26 evaluates false because their dir=neu (which causes line 36 to evaluate true); the condition on line 28 evaluates false as well; but line 30 evaluates true. In the case of C5, the condition on line 32 evaluates to false and propagateDirection is invoked recursively (line 33) to continue the traversal toward node D. In this invocation, the algorithm reaches C7, whose direction is tgt (i.e., does not match C1dir); thus, a valid edge is detected. Therefore, it adds D to the node set (at line 29), and later adds (A;D) to the edge list (at line 19). However, the line towards C is not traversed since C3dir=tgt, which causes the condition on line 32 to evaluate to true during the processing of C2. Note that for the traversal starting at C7, InferEdges reaches C6, where isEnd=true and direction is unk which causes line 24 to evaluate true and the traversal stops. This ensures that the edge (A,D) does not get added twice in the edge set. The final set of intended edges for the flow graph is shown in part (b) of FIG. 9.

Next, we compute the set of edges that are evident from the diagram. Most diagramming formats support a notion of proper connection or glue. For example, on clicking a connector in Visio, the endpoints appear red or green depending upon whether they are glued or dangling. If there exists a connector that is glued at its two ends to two shapes that have been discovered as nodes, then the connector is said to represent an "evident edge".

The set of probable fixes for dangling edges is computed as the difference of the set of intended edges and the set of evident edges. A connector error for a fix is listed as the collection of all connectors that constitute the fix.

Now, our computation of the set of intended edges may be imprecise due to improper setting of the nearness threshold. For example, we consider two lines to be connected when they are not intended to be or vice versa. We compute a confidence against each of our proposed fixes to model our accuracy. Whenever we choose a connection point and its distance d from the node or line is not well within the nearness threshold, we run a risk of being imprecise. To estimate confidence, we first aggregate the differences between the nearness threshold and d, for all connection points that lie on the intended edge listed as the fix. Confidence is taken to be the reciprocal (normalized by some factor) of the aggregation of the differences.

Step 440, Creates a 3-element tuple that includes (error, probable fix, and confidence) and add the tuple to the repository 445, for the subsequent use in a repair pass.

Figure 5:
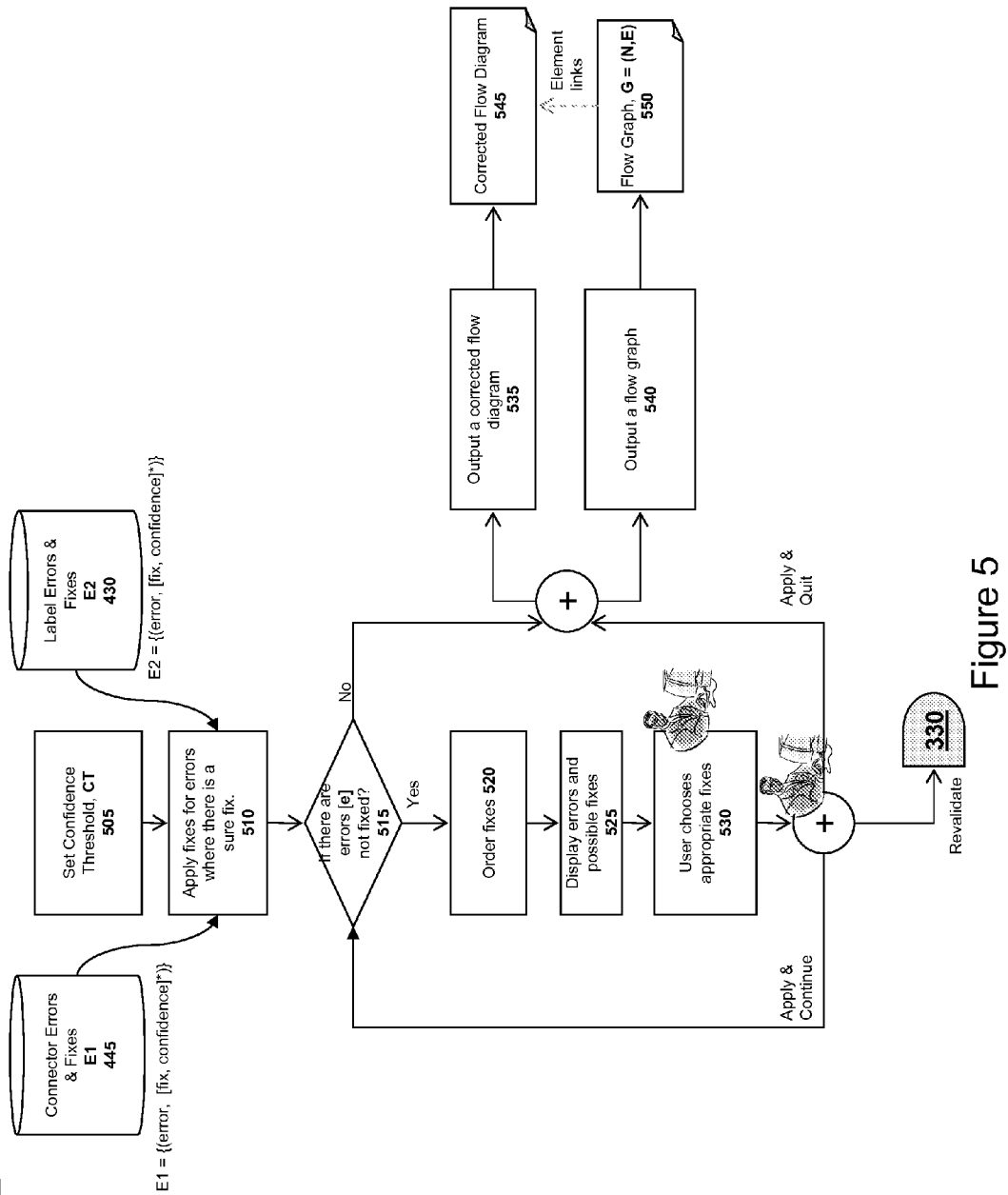
FIG. 5 is flow chart of a process for flow diagram syntax repair.

FIG. 5 is flow chart of a flow diagram syntax repair process 335.

The following are non limiting definitions of the following terms used in FIG. 5 and subsequent figures.

E1={(error, fix, confidence)}, Set of 3 tuples containing Connector Errors and their probable fixes along with the confidence for the fixes.

E2={(error, [fix, confidence]*)} Set of 3 tuples containing "Label Errors" and their probable fixes along with the confidence for the fixes.

Note that in a preferred embodiment, the invention points out a single fix for all Connector Errors and possibly more than one fixes for Label Errors. Hence, the distinction between the sets E1 and E2.

CT—confidence threshold set by the user
c—confidence
[e']—all errors
[e]—each error
G=(N, E)—set of nodes and edges (N,E)

In step 505, the user sets a confidence threshold CT above which fixes may be applied automatically.

In step 510, for all errors [e'] if there is at least one fix available with a confidence c>CT, then apply the fix with the highest confidence.

Perform steps 520 thru 530 iteratively for each error [e] until all errors are fixed.

In step 520, reverse sort all fixes obtained for error [e] in order to rank the fixes by their confidence.

In step 525, display all errors and the suggested fixes for each sorted on confidence to user.

In step 530, user studies the various fixes for every error [e] and selects an appropriate fix. If there are no suggested fixes for some error, he has to manually put in a fix in the drawing itself. Additionally he may choose to re-validate the flow by firing process 330 after making manual modifications to the flow diagram.

In step 535, output a corrected flow diagram, 545, in the original format after applying a fix for every detected error. This flow diagram, 545, is precise and can be processed further by automatic flow transformation facilities.

In step 540, output a flow graph 550 with a well defined set of nodes and edges (N,E) linked to flow diagram elements.

Figure 6:
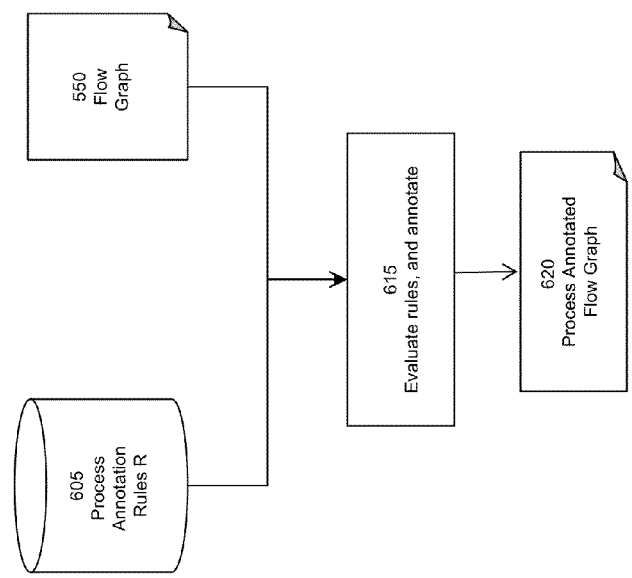
FIG. 6 is flow chart of a process flow annotation process.

FIG. 6 is a flow chart of a Process Flow Annotation process 340.

The following non limiting term definitions are used in FIG. 6 and subsequent figures:

Process annotation rules—used to annotate nodes in a flow graph with process semantics. Non-limiting examples of process semantics can be: activity, gateway, start event, intermediate event, end event, sequence flow, message flow, lanes, pools etc. One embodiment of such rules can be if-then-else like rules that decide a specific class of process semantic for a node/edge by studying its structural, geometric, and descriptive properties.

Indegree—number of incoming edges

Outdegree—number of outgoing edges

Repository 605, represents a Configurable and Editable set of Process annotation rules, R 1000. For example, in a process flow one may choose an annotated node in the flow graph (obtained in step 540), which has one incoming edge (or indegree=1) and more than one outgoing edges (outdegree>1) to be a "Gateway".

Figure 10:
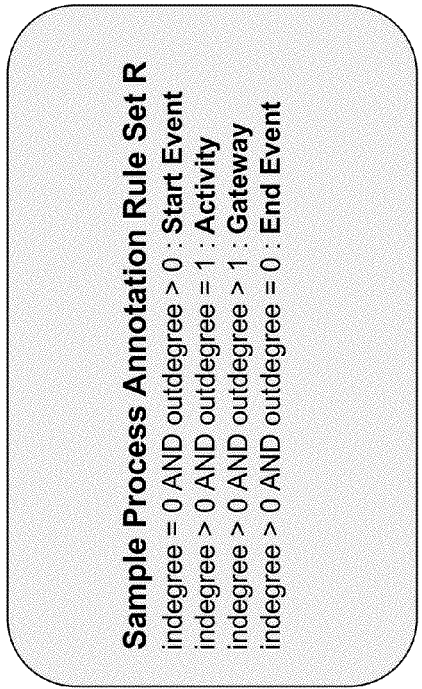
FIG. 10 is a list of non limiting examples of process annotation rules.

FIG. 10 lists non limiting examples of process annotation rules 1000. The user may choose to build richer rules taking into account textual and geometric attributes of nodes and edges.

Flow Graph G=(N,E) 550 produced earlier as a result of Flow Syntax Repair 335 is input to the "Process Flow Annotation" process 340. Apart from the nodes and edges, it also contains annotations about the structural, geometric, and descriptive properties for those nodes and edges. Such properties can be either directly obtained from the parsed diagram elements that constitute the node/edge or they can inferred from the flow graph 550. For example, geometric properties like color, line type may be parsed from the diagram format. Others, like indegree and outdegree for each node in the flow graph can be computed from the graph definition itself.

In step 615, for each n, and e in (N, E) of the Flow graph 550 (outputted from the flow syntax repair process 335), evaluate the rule-set R of 605 and annotate n or e with the suggested process semantics. In a preferred embodiment, the rule set should be so constructed so that exactly one rule gets satisfied for every node n or edge e, yielding exactly one process annotation against each node or edge. For example, if we apply the rule set R (FIG. 10) to the node labeled B in FIG. 9, we would conclude that it is an end event. B has: indegree=2 and outdegree=0. Thus, the last rule in R becomes applicable.

Annotated Flow graph 620 is the modified Flow Graph 550 G=(N,E) (containing nodes and edges annotated with process semantics), resulting from step 615 above to create a semantically annotated flow graph. Note that the input flow graph 540 is only supplemented with process annotations and thus it still retains the element links to the corrected flow diagram, 545.

Figure 7:
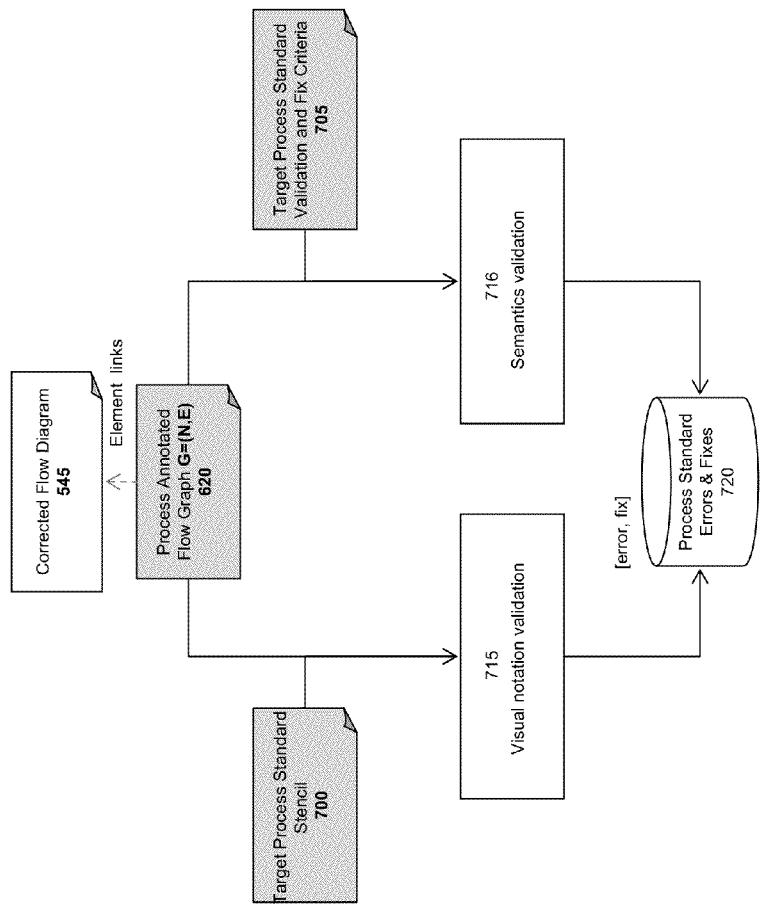
FIG. 7 is flow chart of a business process modeling syntax validation process.

FIG. 7 is a flow chart of a validation process 350.

Process validation seeks to validate the process annotated flow graph, 620 and its corresponding corrected flow diagram, 545, by applying semantic and visual validation criteria, which may be prescribed by certain target process standards.

The input to visual notation validation is a stencil, 700, prescribed by a target process standard, which is a mapping between drawing shapes and process semantics. For example, a target process standard like BPMN, suggests that a "Gateway" should be represented by a "diamond" shape, an "activity" should be represented by a rectangular shape and so on.

In step 715, validate the compliance of the corrected drawing with the visual notations expected by the target Process Standard, by comparing the actual shapes in the corrected drawing that represent the nodes and edges in 620, with the "process standard" expected shape for the semantics annotation for the nodes and edges as specified in 700. For example, if a node in the process annotated flow graph 620, has the annotation "Gateway" and if we validate the drawing, 545, according to the BPMN stencil (described above) then the node must be represented by a diamond shape. If not we generate an error and add it to 720. Here the fix being the shape that represents the "Gateway" node must be drawn with a "diamond" shape.

Target Process Standard Validation and Fix Criteria, 705, lists a set of rules that needs to be validated for a flow graph to comply with the target process standard and also list fixes against the rules that shall be applied if the rules fail. An example of a validation rule, can be: "An node annotated to be an activity cannot have more than one outgoing edge". A corresponding fix can be applied to all activities with more than one outgoing edges is: "Replace the original activity node, O, by an activity, A, followed by a gateway, W, such that all incoming edges to O become incoming edges to A and all outgoing edges from O become outgoing edges from W and there exists an edge from A to W". Both, validation rules and fixes are represented in some machine interpretable form.

In step 716, evaluate the Flow Graph, 620, by matching the each "validation rule specified in 705. For each validation rule that fails, generate an error and add the corresponding fix specified in 705 against the violated validation rule. Add the [error,fix] tuple to 720.

Figure 8:
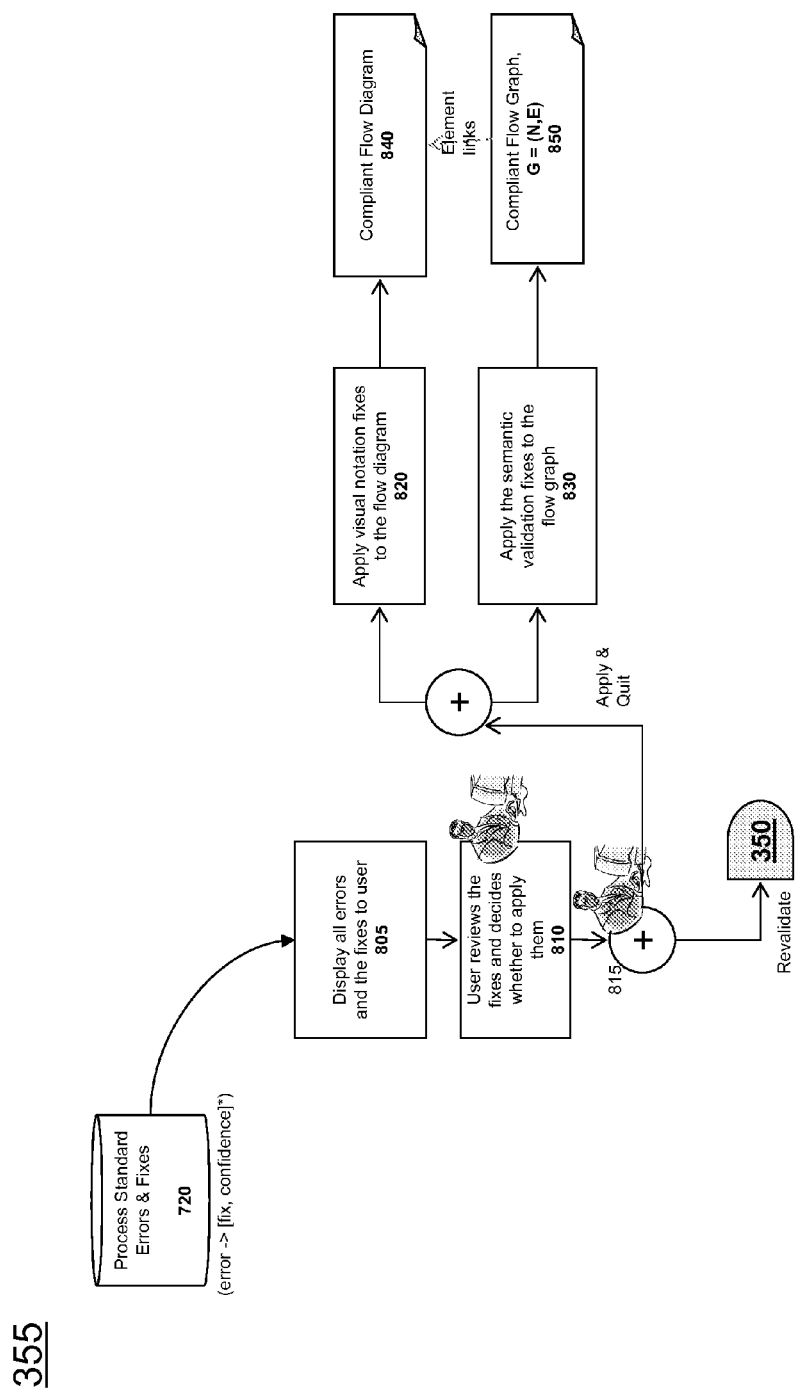
FIG. 8 is flow chart of a business process modeling syntax repair process.

FIG. 8 is a flow chart of a target process repair process 355.

In step 805, display all errors along with their corresponding fixes listed in 720 to the user.

In step 810, the user reviews which of the fixes look appropriate and can be applied. Then in 815, the user either decided to run the "target process standard validation process" or applies the fixes approved by him.

In Step 820, for all errors that are found by the visual notation validation step 715, apply the corresponding fixes to the flow diagram, 545, in order to produce a flow diagram, 840, which is compliant with the chosen target process standard.

In Step 830, for all errors that are found by the semantic validation step 716, apply the corresponding fixes to the flow graph, 620, in order to produce a flow graph, 850, which is compliant with the chosen target process standard.

This invention can be enable on any general purpose computer, either on a single computer, a computer cluster, a computer cloud, client and/or server architectures, and/or distributed across a computer network. These systems are very well known and have various forms of memories, central processing units, user interfaces, network connections, operating systems, and application software. For example, see the description of some example computer systems in U.S. Pat. No. 5,875,446 issued Feb. 23, 1999 to Brown et al. which is herein incorporated by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
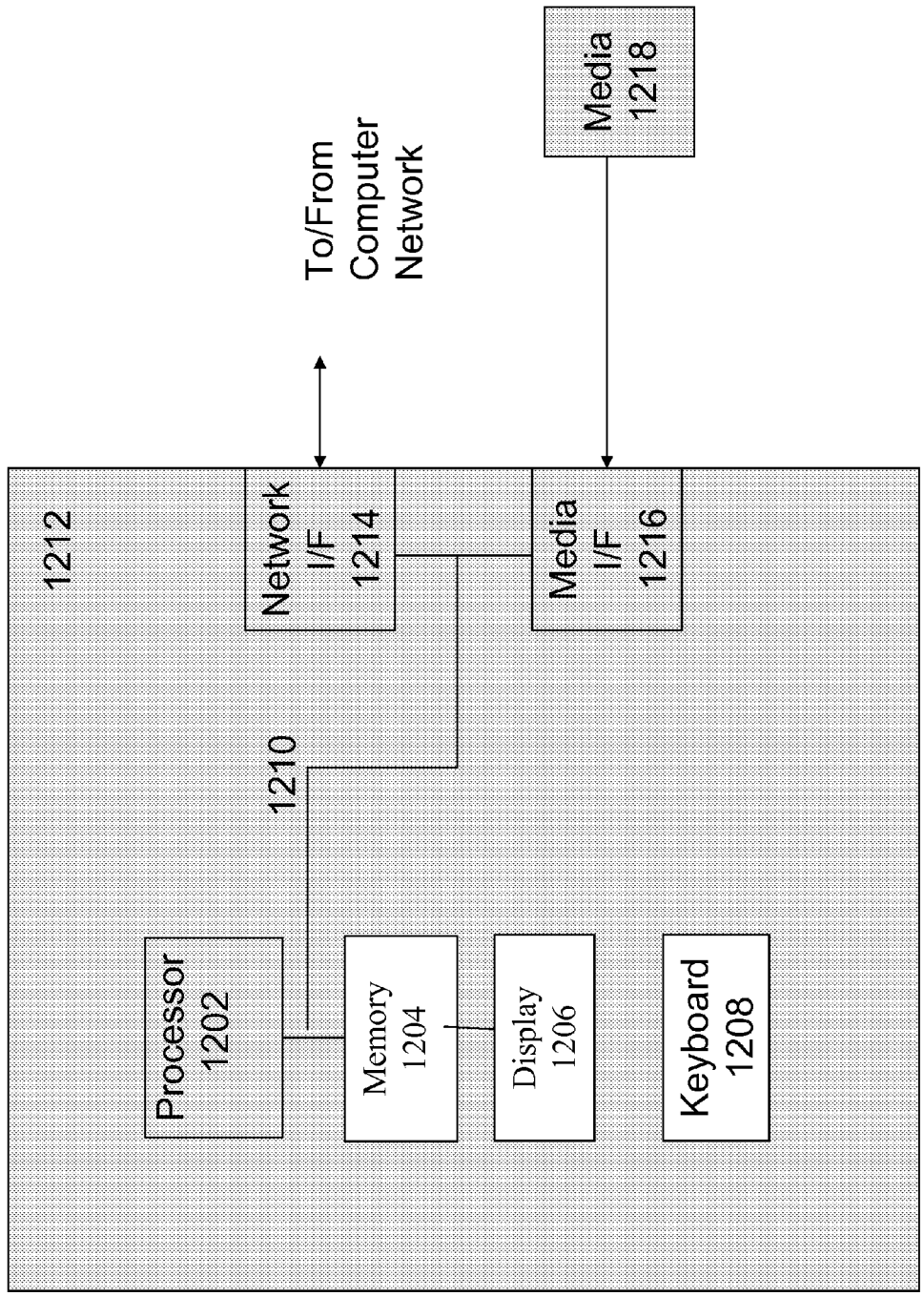
FIG. 12 is a block diagram of the present invention operating on computer hardware.

One or more embodiments can make use of software 300 running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As may be used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations, e.g. 300, and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 3. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing improved flow diagrams and automated systems for providing such flow diagrams.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

We claim:

1. A system comprising one or more computer systems and further comprising:
    one or more memories that contain one or more flow diagrams, each flow diagram having one or more drawings;
    one or more flow graphs stored in the memory and having been interpreted from the flow diagram, each of the flow graphs having one or more nodes and one or more edges, each edge connecting two of the nodes;
    one or more processors coupled to the one or more memories and operative to perform
    a process modeling validation process comprising the steps of:
        identifying one or more structural errors in one or more drawings of one or more flow diagrams, the structural errors causing one or more interpretation difficulties in an automatic interpretation of at least one of the flow diagrams, wherein the step of identifying the one or more structural errors includes a flow syntax validation process comprising:
            parsing one or more of the flow diagrams into a set of one or more diagram elements;
            filtering the diagram elements to discover a filtered flow graph with a set of nodes and a set of candidate edges from the diagram elements;
            identifying errors in the filtered flow graph, and for each identified error, providing a fix description;
        annotating one or more of the nodes and edges with process semantics following a set of process annotation rules to create a semantically annotated flow graph;
        comparing one or more components of the flow diagram and the corresponding semantically annotated flow graph to a set of rules defined by a business process modeling standard; and
        providing a set of the semantic errors describing faulty parts of the drawing that do not comply with the business process modeling standard;
    the one or more processors being further operative to perform:
    a process modeling repair process comprising the steps of:
        repairing the structural errors found in order to enable the automatic interpretation of the flow diagram; and
        repairing the semantic errors to make the flow diagram and its corresponding semantically annotated flow graph comply with the business process modeling standard.

2. A system, as in claim 1, where the business process modeling standard includes any one or more of the following: Business Process Modeling Notation (BPMN), WS-BPEL, and XPDL.

3. A system, as in claim 1, where the structural errors and semantic errors comprise a set of errors.

4. A system, as in claim 3, where the set of errors include any one or more of the following: a dangling edge, a dangling connector, a connector touching but not actually connected to a shape, a failure to close, and an incorrect location of a node.

5. A system, as in claim 3, where one or more of the errors in the set of errors are label errors.

6. A system, as in claim 3, where one or more of the errors in the set of errors are connector errors.

7. A system, as in claim 1, where the process annotation rules are applied to determine process semantics for nodes or edges in a flow graph.

8. A system, as in claim 7, where the process annotation rules are one or more of the following:
    if indegree=0 AND outdegree>0: Start Event;
    if indegree>0 AND outdegree=1: Activity;
    if indegree>0 AND outdegree>1: Gateway; and
    if indegree>0 AND outdegree=0: End Event.

9. A system, as in claim 1, where the process modeling repair process further creates a precise definition of a flow graph implicit in a flow diagram, which has one or more nodes and one or more edges that each correspond to one or more shapes in the flow diagram.

10. A system, as in claim 1, wherein:
    one or more of the diagram elements corresponds to one or more of a: node, edge, and label;
    further including identifying unlinked labels and dangling edges as the errors in the filtered flow graph; and
    for each unlinked label and dangling edge providing, respectively, an unlinked label record containing an error description relating to the unlinked labels, a fix description relating to the unlinked labels, and a confidence level and a connector errors and fixes record containing dangling edge errors, fix descriptions relating to the dangling edges, and confidence levels relating to the fix descriptions.

11. A system, as in claim 10 wherein the one or more processors are further operative to perform a process flow repair process that comprises the steps of:
    a. comparing a confidence threshold to one or more of the confidence levels ;
    b. if one or more unlinked label records have a confidence level that meet or exceed the confidence threshold, applying a fix described by the respective fix description having a highest confidence level to the respective unlinked label, the fix causing association of the unlinked label with a selected node or edge;
    c. repeating step b until all errors having an error description have a fix or there is a failed list of unlinked labels with respective confidence levels that do not meet the confidence threshold;
    d. displaying one or more of the respective error descriptions and one or more fix descriptions to a user;

e. receiving a selection of a fix description for the unlinked label from the user and applying a fix described by the selected fix description to the respective unlinked label, the fix causing association of the unlinked label with a selected node or edge;

f. repeating steps d and e until the user stops selecting; and g. outputting a corrected flow graph being the flow graph with the fixes.

12. A system, as in claim 1, where the process modeling validation process annotates with an annotation process comprising the steps of: for one or more nodes and one or more edges on the flow graph, evaluating a rule-set; and annotating one or more of the nodes and edges with process semantics determined by the rule-set to create a modified flow graph.

13. A system, as in claim 12, wherein the one or more processors are further operative to perform the steps of: validating a compliance of the modified flow graph with one or more visual notations determined by a target process standard by comparing the actual shapes that represent the nodes and edges in the modified flow graph with one or more process standard expected shapes.

14. A system, as in claim 13, wherein the one or more processors are further operative to perform the steps of: providing shape error and fix information to a user; and performing changes to the modified flow graph that are accepted by the user.

15. A method for validating and repairing one or more flow diagrams, each flow diagram having one or more drawings created in an informal drawing tool, the method comprising the steps of:

creating one or more flow graphs interpreted from the flow diagram, each of the flow graphs having a plurality of nodes and one or more edges, each edge connecting two of the nodes;

identifying one or more structural errors in one or more drawings of one or more flow diagrams, the structural errors causing one or more interpretation difficulties in an automatic interpretation of at least one of the flow diagrams, the step of identifying the one or more structural errors including a flow syntax validation process comprising:

parsing one or more of the flow diagrams into a set of one or more diagram elements;

filtering the diagram elements to discover a filtered flow graph with a set of nodes and a set of candidate edges from the diagram elements;

identifying errors in the filtered flow graph, and for each identified error, providing a fix description;

annotating one or more of the nodes and edges with process semantics following a set of process annotation rules to create a semantically annotated flow graph;

comparing one or more components of the flow diagram and the corresponding semantically annotated flow graph to a set of rules defined by a business process modeling standard;

providing a set of semantic errors describing faulty parts of the drawing that do not comply with the business process modeling standard;

repairing the structural errors to enable automatic interpretation of the flow diagram, and repairing the semantic errors to make the flow diagram and its corresponding semantically annotated flow graph comply with the business process modeling standard.

16. A system for validating and repair one or more flow diagrams created in an informal drawing tool, each flow diagram having one or more drawings, the system comprising:

means for creating one or more flow graphs interpreted from the flow diagram, each of the flow graphs having a plurality of nodes and one or more edges, each edge connecting two of the nodes;

means for identifying one or more structural errors in one or more drawings of one or more flow diagrams, the structural errors causing one or more interpretation difficulties in an automatic interpretation of at least one of the flow diagrams, the means for identifying one or more structural errors further including means for conducting a flow syntax validation process comprising:

parsing one or more of the flow diagrams into a set of one or more diagram elements;

filtering the diagram elements to discover a filtered flow graph with a set of nodes and a set of candidate edges from the diagram elements;

identifying errors in the filtered flow graph, and for each identified error, providing a fix description;

means for annotating one or more of the nodes and edges with process semantics following a set of process annotation rules to create a semantically annotated flow graph;

means for comparing one or more components of the flow diagram and the corresponding semantically annotated flow graph to a set of rules defined by a business process modeling standard;

means for providing a set of the semantic errors describing faulty parts of the drawing that do not comply with the business process modeling standard;

means for repairing the structural errors found in order to interpret one or more of the process flow diagrams to enable the automatic interpretation of the flow diagram, and means for repairing the semantic errors to make the flow diagram and its corresponding semantically annotated flow graph comply with the business process modeling standard.

17. A system comprising:

one or more memories that contain one or more flow diagrams, each flow diagram having one or more drawings, and one or more processors coupled to the one or more memories and operative to perform the steps of:

performing a flow syntax validation process including:

parsing the flow diagram to identify a set of diagram elements that can be classified into nodes, edges and labels, obtaining a filtered flow graph with a set of nodes and a set of candidate edges from the diagram elements, identifying unlinked labels in the filtered flow graph as errors, identifying probable fixes by associating the unlinked labels with probable nodes or edges, identifying dangling edges in the filtered flow graph as errors, and identifying probable fixes for the dangling edges;

performing a flow diagram syntax repair process including:

applying fixes for errors having at least one fix available with a confidence exceeding a confidence threshold, displaying errors and applied fixes, outputting a corrected flow diagram after applying the fixes, and outputting a corrected flow graph linked to elements of the flow diagram;

annotating one or more of the nodes and edges of the corrected flow graph with process semantics following a set of process annotation rules to create a semantically annotated flow graph;

performing a business process modeling syntax validation process including:
  evaluating the semantically annotated flow graph for compliance with a set of validation rules defined by a business process modeling standard,
  generating semantic errors that do not comply with the business process modeling standard,
  obtaining a set of process standard errors comprising the semantic errors and errors based on visual validation criteria; and displaying the process standard errors and corresponding fixes.

18. The system of claim 17, wherein the one or more processors are further operative to perform the steps of:
  applying the fixes to the annotated flow graph corresponding to semantic errors, and
  producing a compliant flow graph from the annotated flow graph having the applied fixes.

19. The system of claim 17, wherein the one or more processors are further operative to perform the steps of:
  applying the fixes corresponding to the errors based on the visual validation criteria to the corrected flow diagram, and
  producing a compliant flow diagram from the corrected flow diagram including the applied fixes to the corrected flow diagram.

* * * * *